United States Patent [19]
Graves et al.

[11] 3,778,028

[45] Dec. 11, 1973

[54] LINED BUTTERFLY VALVE

[75] Inventors: Gail W. Graves, Richmond; Gerald R. Pope; Joseph T. Stewart, Jr., both of Houston; Willard L. Petrosky, Alief, all of Tex.

[73] Assignee: John L. Dore' Co., Houston, Tex.

[22] Filed: Aug. 2, 1972

[21] Appl. No.: 277,404

[52] U.S. Cl. .............................. 251/306, 137/375
[51] Int. Cl. ........................................ F16k 1/226
[58] Field of Search ................. 137/375; 251/214, 251/298, 306, 308

[56] References Cited
UNITED STATES PATENTS

| 3,073,336 | 1/1963 | Johnson | 137/375 |
| 3,334,650 | 8/1967 | Lowrey et al. | 137/375 |
| 3,420,498 | 1/1969 | Housworth | 251/306 X |
| 3,425,439 | 2/1969 | Duffey et al. | 137/375 |
| 3,661,171 | 5/1972 | Smith et al. | 137/375 |

Primary Examiner—Henry T. Klinksiek
Attorney—James F. Weiler et al.

[57] ABSTRACT

A butterfly valve for use under both pressure and vacuum conditions in corrosive fluid service, the valve having a body member, a substantially rigid plastic resin lining seated within a bore of the body, a disc encapsulated with plastic resin and pivotally mounted within the bore, and first and second packing means disposed between supporting members of the disc and the lining of the body to provide an effective seal against leakage therebetween. In a further embodiment, a resilient seat is disposed between the lining and body member to yieldably urge the lining into engagement with the disc for more positive closure of the disc relative to the body and the lining.

18 Claims, 9 Drawing Figures

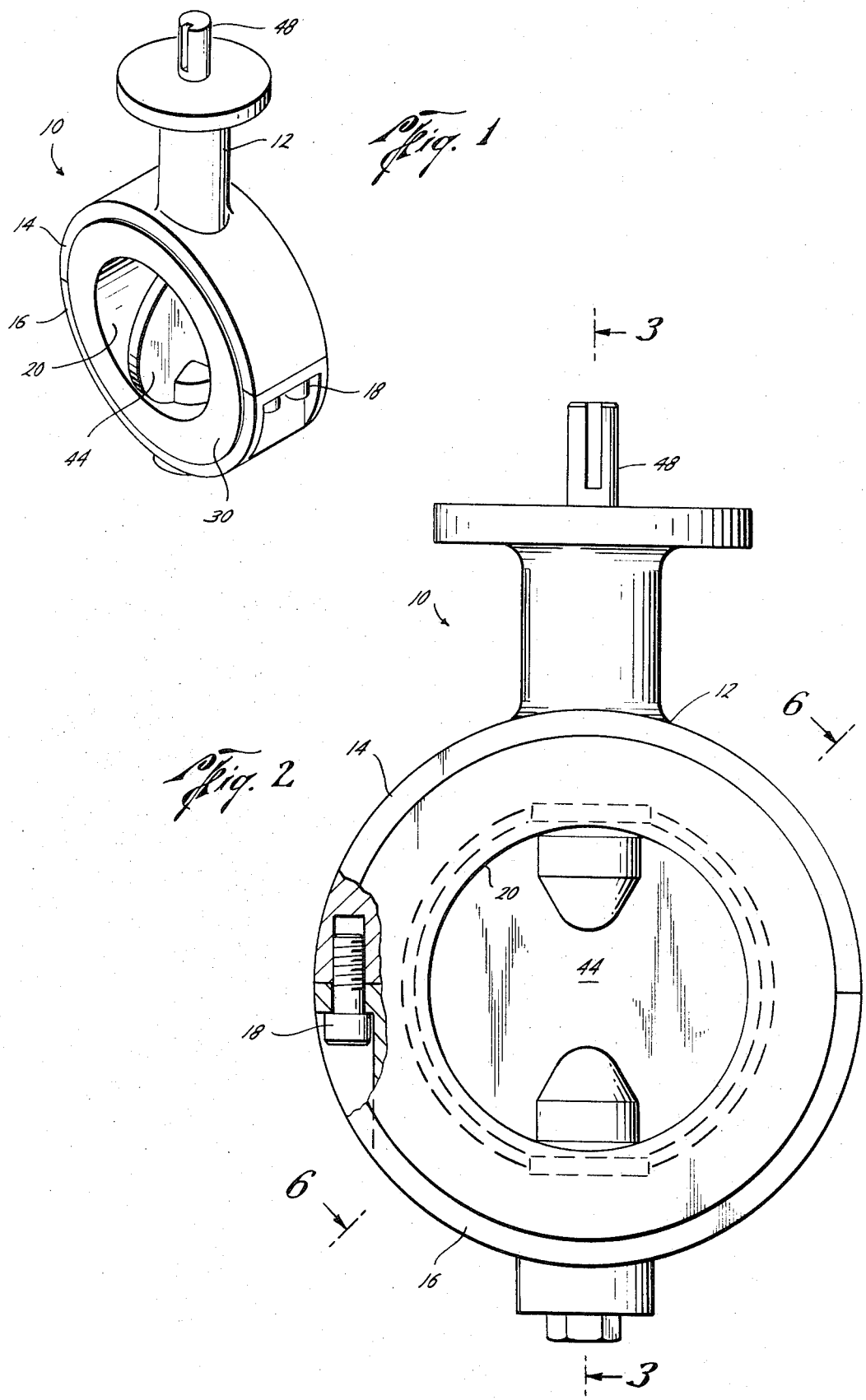

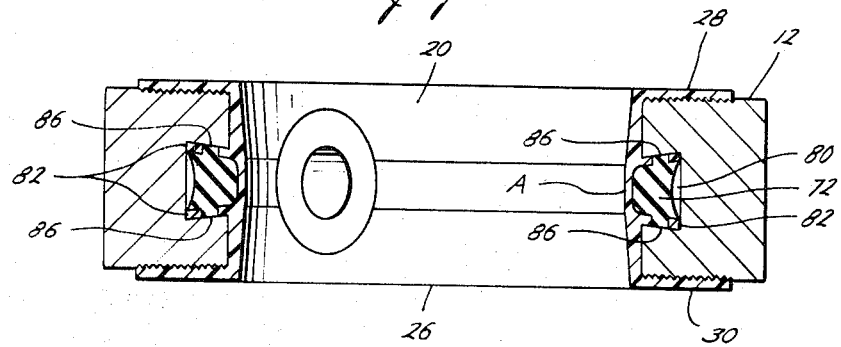
Fig. 6
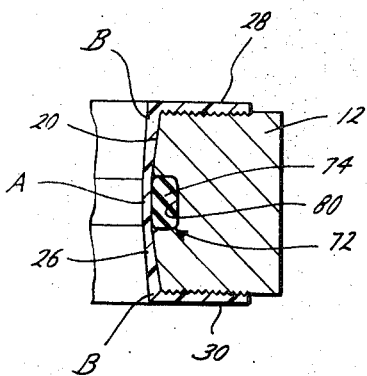
Fig. 8
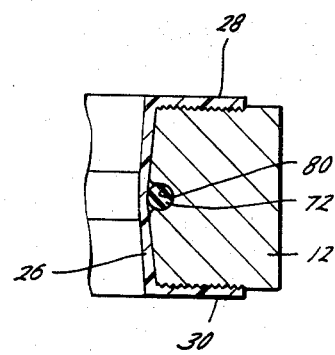
Fig. 9
Fig. 7

LINED BUTTERFLY VALVE

BACKGROUND OF THE INVENTION

Butterfly valves have long been used in the chemical process and related industries for regulating flow of fluid through pipes. The valves have been lined in various ways for purposes of adapting them for use with corrosive gases, liquids and fluids, and under varying pressure conditions. Rubber liners have been used extensively and rubber seals are commonly used between rotating parts to protect against leakage. With the advent of various types of plastic resin materials, still other liners have been developed for use with butterfly valves to meet specific corrosion problems.

Examples of butterfly valves of which the present invention is an improvement are illustrated in U.S. Pat. Nos. 3,095,177; 3,420,498; 3,425,439; and 3,647,180. The foregoing list is not necessarily comprehensive of the pertinent or related art.

It would be highly advantageous to provide a butterfly valve device useful under varying pressures conditions ranging from high vacuum to high pressure and having lined surfaces in contact with fluids transmitted therethrough to prevent corrosion of the valve and provide against damaging and potentially hazardous leakage while providing long operational life. Although these advantages are provided in varying degrees by prior and conventional valve devices, conventional devices have suffered the shortcomings of high manufacturing costs, lack of salvagability after wear because of integrated construction, lack of adaptability to both pressure and vacuum operation without alteration of packing or sealing members, incapability of having all parts being replaceable, as well as other problems and disadvantages. The improvements of the present invention are directed to overcoming these problems to provide the advantages as now will be set forth.

SUMMARY OF THE PRESENT INVENTION

The butterfly valve of the present invention includes a body member having a cylindrical bore and opposed openings communicating with the bore, a substantially rigid plastic resin lining seated within the bore of the body to define a flow passage therethrough, a lined disc pivotally mounted within the lining and the body for regulating flow of fluid through the valve, the disc being mounted by means of a valve stem rigidly secured to the disc and projecting through a collar formed in the lining and through an opening in the body and a pivot pin securable to the body and projecting through another collar formed in the lining and through the other opening of the body. Packing means are disposed between and for sealing between the valve stem and the lining and between the pivot pin and the lining.

The packing means in each instance includes at least one annular packing member and a compression spring or similar type adjusting gland biasing the packing member into sealing engagement with, in one instance, the valve stem, and, in another instance, the pivot pin as well as the lining member.

In a preferred embodiment, a resilient seat member yieldably urges the lining into engagement with the disc when the disc is in a position so to close the valve. The resilient seat member includes an annular ring-like portion and two diametrically opposed collars, the resilient seat member being positioned in a sealable manner as will be described.

Finally, linings of other embodiments of the present invention are of tapered thicknesses in cross-sectional configuration so as to be uniquely adapted for use under either positive or negative pressure conditions to increase resistance to failure yet providing limited flexibility for proper operation of the valve.

It is, therefore, an object of the present invention to provide an improved butterfly valve apparatus lined with a substantially rigid plastic resin for use under varying conditions of vacuum and pressure in corrosive service.

Yet a further object of the present invention is to provide an improved butterfly valve device of the type just described having packing means disposed between pivotal portions of the disc and the lined body member of the valve to prevent leakage of corrosive and potentially harmful fluids that might otherwise damage the valve and associated apparatus as well as pose a serious risk to operating personnel.

Yet a further object of the present invention is the provision of such an improved butterfly valve apparatus having a resilient seat member disposed between the lining and the body members of the valve and combined with the packing means to effect positive closing action without leakage under either pressure or vacuum conditions.

A still further object of the present invention is the provision of such a valve that is easily assembled and readily disassembled for replacement of worn components to insure long valve life as compared with conventional devices.

Still other objects, features and advantages will be apparent from the following description of the presently preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views wherein, FIG. 1 is a perspective of a buttervly valve device according to the present invention, FIG. 2 is an elevation view showing the valve partially cut away, FIG. 6 is a partial view of the lining and body members with a resilient seat therebetween, the view being partly in cross-section and taken along the line 6-6 of FIG. 2, FIG. 7 is a partial view, partly in cross-section, of a further embodiment of the resilient seat and lining members, FIG. 8 is still another partial view, partly in cross-section, showing another embodiment of the lining, resilient seat and body members, and FIG. 9 is yet a further partial view, partly in cross-section, showing a still further embodiment of the lining, resilient seat and body members.

DESCRIPTION OF THE PREFERRED EMBODIMENTS

Figure 3:
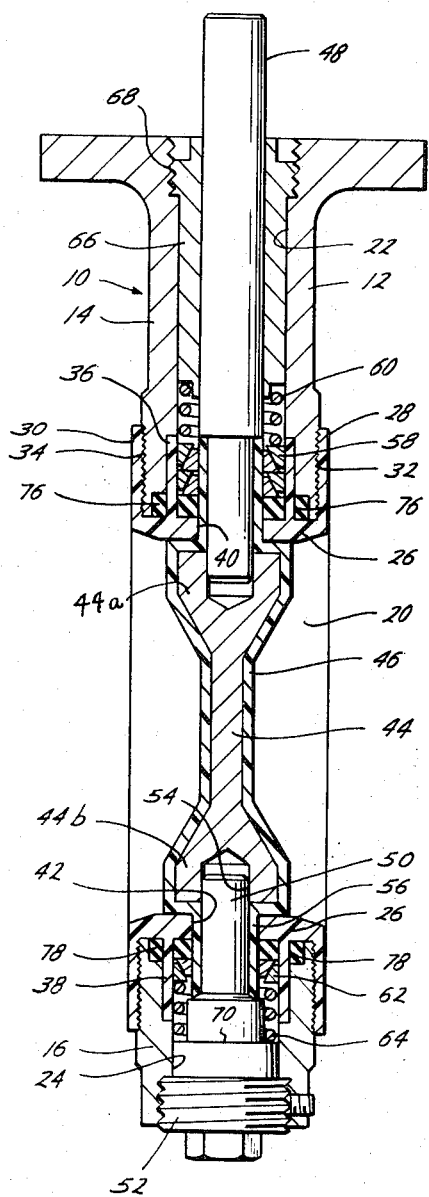
FIG. 3 is an elevation view in cross-section taken along the line 3—3 of FIG. 2.

Referring now to the drawings and particularly FIGS. 1, 2 and 3, the butterfly valve device 10 of the present invention is provided with a body member 12, the body member preferably being formed of two halves 14 and 16 for ease of manufacture and assembly. The halves 14 and 16 may be joined such as by means of suitable bolts 18 as shown in FIGS. 1 and 2.

The body member 12 is formed with a cylindrical bore 20 as best shown in FIG. 1. As may be seen in FIG. 3, the body member 12 also is provided with diametrically opposed openings 22 and 24 that communicate with the bore 20. The openings 22 and 24 are adapted to receive means for holding and sealing a disc as will be explained hereafter.

Figure 4:
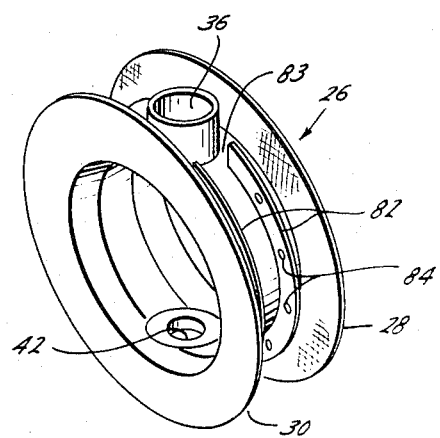
FIG. 4 is a perspective view of a lining member adapted to seat within the body of the valve.

A substantially rigid plastic resin lining 26 is seated within the cylindrical bore 20 of the body 12 and defines a flow passage through the bore 20 of the body. As shown in FIG. 4, the liner 26 has end flanges 28 and 30 to extend radially over the ends or faces 32 and 34 of the body member (FIG. 3). Diametrically opposed collars 36 and 38 are formed in the lining 26, the collar 36 being visible in FIG. 4 and both collars 36 and 38 being shown in FIG. 3. The collars 36 and 38 engage within the opposed openings 22 and 24, respectively, of the body member 12. It should be noted that the collars 36 and 38 extending from the outer surface of the lining 26 are formed of the lining about apertures 40 and 42 therewithin. The aperture 42 is visible in FIG. 4 while both apertures 40 and 42 are visible in FIG. 3.

As shown in FIGS. 1, 2 and 3, the butterfly valve of the present invention is provided with a disc 44 that may be formed of or otherwise encapsulated with plastic resin. As shown in FIG. 3, the disc 44 is encapsulated with a plastic resin forming a lining 46.

The disc 44 is pivotally mounted within the lining 26 and body 12 for movement into and out of a position in a plane transverse to the flow passage of the lining 26. The disc 44 is mounted for pivotal movement by means of a valve stem 48 that is rigidly secured to the disc at one end such as by being cast therewith, press fit, hex fit, threaded engagement, welded, or the like. The valve stem 48 projects through the collar 36 of the lining 26 and through the opening 22 of the body member and extends outwardly from the body member as shown in FIGS. 1, 2 and 3. Thus, the upper and outwardly extending portion of the valve stem 48 may receive a handle (not shown) for opening and closing the valve.

Continuing with regard to FIG. 3, additional means are provided for pivotal mounting of the disc 44 within the body 12 including a pivot pin 50 securable to the body member 12 such as by means of a threaded connection at the outer end 52 of the pivot pin. The pivot pin 50 projects through the collar 38 as well as the opening 42 of the lining 26 to engage a socket 54 formed in the disc 44. The socket 54 also includes a boss 56 formed of the plastic resin and being in effect an extension of the liner 46 encapsulating the disc 44. Consequently, the socket 54 and the boss 56 receive the pivot pin 50.

Again, with respect to FIG. 3, packing means are provided between the valve stem 48 and the body 12 and between the pivot pin 50 and the body 12 for purposes of sealing therebetween. The packing means disposed between the valve stem 48 and the body 12 includes at least one and preferably a plurality of annular packing members 58 shown in the drawing as annular rings of wedge shape cross section although the members can be V-rings or any other type seal rings. The annular rings or packing members 58 are positioned between the valve stem 48 and the collar 36 through which the valve stem projects. Preferably, the lining 46 formed about an encapsulating the disc 44 extends upwardly and along the valve stem 48 to a point such that it engages the annular packing members 58 as shown in FIG. 3. A compression spring 60, or other suitable similar type adjustment gland, is positioned behind the packing members 58 and biases the packing members into sealing engagement with the valve stem 48 and the lining 26. As shown in FIG. 3, the collars 36 and 38 are both spaced from the apertures 40 and 42 formed in the lining 26 so that the lining may be engaged by the packing members.

A similar packing arrangement is provided between the pivot pin 50 and the body member 12 for sealing between the boss 56 formed of the plastic resin 46 encapsulating the disc 44 and the collar 38 through which the pivot pin passes. Thus, the packing means includes annular packing members 62 again shown as being annular rings of wedge shape cross-section although other suitable annular packing members may be used. A compression spring 64 or other suitable similar type adjustment gland biases the packing members 62 into sealing engagement with the boss 56 formed of the plastic resin encapsulating the disc 44 and the lining 26 within the collar 38 through which the pivot pin 50 passes.

The spring 60 biasing the annular packing members 58 is retained in a biasing position by means of a packing follower and bearing 66 which may engage and be retained within the body 12 such as by means of a threaded connection 68. Thus, the packing follower and bearing 66 acts to retain the spring 60 and also serves to position and guide rotation of the valve stem 48. As indicated in FIG. 3, the pivot pin 50 serves as a packing follower by providing a spring seating surface 70 as shown in the drawing.

Figure 5:
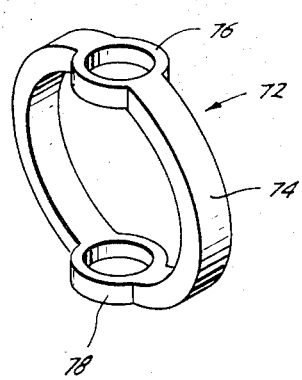
FIG. 5 is a perspective view of a resilient seat member for yieldably urging the lining of FIG. 4 into sealing engagement with the disc of the valve during operation thereof.

As best seen in FIG. 5, the butterfly valve device of the present invention preferably is provided with a resilient seat member 72 disposed between the body 12 and the lining 26 as will be explained hereafter. The resilient seat member 72 has an annular, ring-like portion 74 and two diametrically opposed collars or eyelets 76 and 78 integrally formed with the ring-like portion.

As shown, for example, in FIG. 8, the body member 12 preferably is provided with an inwardly-facing, annular groove 80 centrally formed in the wall of the bore 20, the axis of the annulus of the groove 80 being coextensive with the axis of the bore 20. The annular groove 80 receives the resilient seat member 72 so that the resilient seat member yieldably urges the lining 26 into engagement with the disc 44 when the disc 44 is in a position in a plane transverse to the flow passage of the lining 26, i.e., when the disc 44 is in a position as shown in FIG. 2.

As shown in FIG. 3, the opposed collars 76 and 78 of the resilient seat member 72 engage about the collars 36 and 38, respectively, of the lining 26 within appropriate recesses provided in the body 12. Consequently, the resilient seat member 72 yieldably urges the lining 26 into engagement with the disc 44 about the inner circumference of the lining 26. This yieldable urging function provides positive sealing action between the disc 44 and the lining 26 so that, when the disc is closed relative to the body member 12, there is no flow of fluid through the valve. This yieldable urging function is enhanced at points around and adjacent to the valve stem 48 and pivot pin 50 by forming the disc 44 in an outwardly flaring manner as represented by the reference characters 44a and 44b. As a result, the expanded thickness of the disc at such points provides a greater area with which to mate with and sealably engage the lining 26 at the pivot points of the disc.

Referring now to FIGS. 4 and 6, a preferred embodiment of the present invention is shown wherein the lining member 26 is provided with two parallel annular ribs 82 formed on the outer surface of the lining 26 and extending around a substantial portion of the circumference of the lining. As indicated in FIG. 6, the parallel annular ribs 82 engage the sidewalls of the groove 80 within the valve body 12 such that the resilient seat member 72 is retained between the ribs and within such groove.

As shown in FIG. 4, the parallel annular ribs 82 terminate on either side of both lining collars 36 to provide spaces such as that indicated by reference numeral 83 for the eyelets 76 and 78 of the resilient seat member 74 to engage about the collars 36 and 38.

Preferably, a plurality of spaced holes 84 are provided in the ribs 82 (FIG. 4) and spaced tips 86 are formed on the resilient seat member 72 for engagement with the holes 84 of the ribs to restrict movement of the resilient seat. In other words, mating of the tips 86 with the holes 84 serves to keep the resilient seat member 72 from "wiping out" or becoming dislodged during opening and closing action of the disc 44 relative to the body member 12.

In yet a further embodiment of the present invention and, as illustrated in FIG. 8, the lining 36 tapers outwardly to a larger thickness from a point indicated by the reference character A adjacent to the resilient seat member 80 to a point B in the area of the end flanges 28 and 30. The function of the increasing tapered thickness is to improve the lining's resistance to vacuum failure in the thicker part of B of the lining 26 while the thinner part A of the lining provides flexibility in order that the disc 44 may sealably seat against the lining during closing operations. Thus, this lining embodiment is uniquely suited for use in vacuum or other low-pressure conditions to minimize the likelihood of liner failure and improve positive closure of the valve.

With regard to FIG. 7, a further embodiment of the resilient seat member is shown wherein the resilient portion 72a is bonded or otherwise affixed to a metallic support 88. Both the resilient portion 72a and the metallic portion 88 of the seat member are generally of a configuration similar to that shown in FIG. 5, the resilient portion 72a being affixed by any suitable means to the metallic portion. The metallic portion may be provided with tips 86 to engage holes 84 (FIG. 4) of the parallel annular ribs 82 of the lining 26. In addition, the lining 26 may be provided with a recess 27 to accommodate the resilient portion of the seat member. While it is preferred that the resilient portion 72a be bonded or otherwise affixed to the metallic portion 88 of the seat member, it will be recognized that portions 72a and 88 may be formed separately without being bonded and may be installed about the lining 26 in such a manner that the tips 86 engaging the holes 84 (FIG. 4) retain the metallic portion 88 to in turn retain the resilient portion 72a in a fixed position.

Finally, with regard to FIG. 9, still a further embodiment of the resilient seat member 72 is shown being of a circular cross-section configuration and the groove 80 within the body member 12 being of a similar configuration. The lining of FIG. 9 tapers outwardly to a larger thickness similar to that of FIG. 8 for reasons explained in connection with FIG. 8.

The lining 26 illustrated in FIGS. 6 and 7 tapers outwardly to a smaller thickness, i.e., is the reverse of the lining configuration of FIG. 8. The lining shown in FIGS. 6 and 7 is well suited for use in high operating pressure conditions to limit "cold flow" and forces that tend to distort a liner under pressure conditions. However, it will be noted that the center portions represented by the character A are preferably thin-walled in order for resiliency of the seat member 72 to be transmitted to the lining 26 for a proper closure of the disc 44 against the lining.

The plastic resins that may be used to form the substantially rigid plastic resin lining 26 as well as for encapsulating the disc 44 may be any suitable type depending upon the type of materials to be processed through the valve 10. Fluorocarbon resins are particularly useful inasmuch as they are corrosion resistent and may be used with a wide variety of chemicals. Representative substantially rigid fluorocarbon resins that may be used include polytetrafluoroethylene, fluoroethylene propylene, polychlorotrifluoroethylene, vinylidene fluoride resins and copolymers thereof and the like. However, other plastic materials may be used such as polyethylene and polypropylene as well as vinyl polymers.

Any suitable resilient material may be used in forming the resilient seat member 72. Cured elastomer materials having the necessary resiliency and compression characteristics are suitable for use in the present invention, including natural rubber, silicon rubber, butyl rubber, neoprene and a wide variety of synthetic and hydrocarbon rubbers.

In assembling the butterfly valve device of the present invention for use, the resilient seat member 72 is placed about the lining 26, the eyelets or collars 76 and 78 of the seat member engaging about the collars 36 and 38 of the lining. The valve stem 48 and the disc 44 are then positioned within the lining 26 and the upper half 14 of the body member 12 is positioned over the lining and the valve stem 48 is placed within the opening 22 therewithin. Similarly, the lower half 16 of the body 12 is placed over the lower portion of the lining 26 and the two body halves 14 and 16 are bolted together. The packing members 85 are positioned about the valve stem 48 and the spring 60 inserted and secured by the packing follower and valve stem bearing 66. The packing members 62 are positioned about the boss 56 of the disc, the spring 64 inserted and the pivot pin 50 placed in position as shown in FIG. 3.

By virtue of the packing members 58 and 62 being biased so as to bear against the lining 26, collars 36 and 38 and extensions of the disc lining 46, the valve 10 of the present invention is sealed aginst leakage of fluids about the pivot points of the disc during operation thereof. Sufficient compression is provided by the springs 60 and 64 to promote the sealing function yet compression is not so great that operation of the valve is hindered.

Positive closure of the valve 10 is promoted by means of the resilient seat member 72 yieldably urging the valve lining 26 into engagement with the periphery of the disc 44 during closure. Thus, not only is the valve sealed against otherwise dangerous leakage of materials from within, the valve is also capable of positive closing action to prevent flow of fluids therethrough.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. A butterfly valve, including,
   a. a body member having
      i. a cylindrical bore and
      ii. diametrically opposed openings communicating with said bore,
   b. a plastic resin lining seated within the cylindrical bore of the body (a) defining a flow passage therethrough,
      i. end flanges extending radially over the ends of the body (a), and
      ii. diametrically opposed collars extending from the outer surface of and about apertures formed in the lining (b), engaging within the opposed openings (a) (ii) of the body member (a),
   c. a disc, encapsulated with plastic resin, pivotally mounted within the lining (b) and body member (a) for movement into and out of a position in a plane transverse to the flow passage of the lining (b),
   d. said disc (c) being pivotally mounted by means of,
      i. a valve stem rigidly secured to the disc and projecting through one of the collars (b) (ii) and opening (a) (ii), and
      ii. a pivot pin secured to the body (a) projecting through the other of the collars (b) (ii) and openings (a) (ii) and engaging a socket formed in the disc (c), said socket including a boss formed of the plastic resin encapsulating the disc receivably engaging about said pivot pin,
   e. first packing means disposed between and for sealing between the valve stem (d) (i) and the collar (b) (ii) through which said stem projects, and
   f. second packing means disposed between and for sealing between the boss formed of the plastic resin encapsulating the disc and the collar (b) (ii) through which the pivot pin (d) (ii) projects.

2. The invention of claim 1 wherein the first packing means (e) includes,
   at least one annular packing member, and
   a compression spring biasing the packing member into sealing engagement with the valve stem (d) (i) and lining (b) within the collar (b) (ii) through which the valve stem (d) (i) passes.

3. The invention of claim 2 whrein at least a portion of the valve stem (d) (i) adjacent the disc (d) is encapsulated with plastic resin for sealing engagement with the packing member.

4. The invention of claim 2 wherein the annular packing member includes a plurality of annular rings of wedge shape cross-section.

5. The invention of claim 1 wherein the second packing means (f) includes,
   at least one annular packing member, and
   a compression spring biasing the packing member into sealing engagement with the boss formed of the plastic resin encapsulating the disc (d) and lining (b) within the collar (b) (ii) through which the pivot pin (d) (ii) passes.

6. The invention of claim 5 wherein the annular packing member includes a plurality of annular rings of wedge-shaped cross-section.

7. The invention of claim 1 wherein the plastic resin in each instance is a fluorocarbon resin.

8. A butterfly valve including,
   a. a body member having
      i. a cylindrical bore,
      ii. diametrically opposed openings communicating with said bore, and
      iii. an inwardly-facing annular groove centrally formed in the wall of the bore (a) (i), the axis of the annulus of which is coextensive with the axis of the bore (a) (i),
   b. a plastic resin lining seated within the cylindrical bore of the body (a) defining a flow passage therethrough, and having
      i. end flanges extending radially over the ends of the body (a) and
      ii. diametrically opposed collars extending from the outer surface of and about apertures formed in the lining (b), engaging within the opposed openings (a) (ii) of the body member (a),
   c. a disc, encapsulated with plastic resin, pivotally mounted within the lining (b) and body member (a) for movement into and out of a position in a plane transverse to the flow passage of the lining (b),
   d. said disc (c) being pivotally mounted by means of,
      i. a valve stem rigidly secured to the disc and projecting through one of the collars (b) (ii) and openings (a) (ii), and
      ii. a pivot pin secured to the body (a) projecting through the other end of the collars (b) (ii) and openings (a) (ii) and engaging a socket formed in the disc (c), said socket including a boss formed of the plastic resin encapsulating the disc receivably engaging about said pivot pin,
   e. first packing means disposed between and for sealing between the valve stem (d) (i) and the collar (b) (ii) through which said stem projects,
   f. second packing means disposed between and for sealing between the boss formed of the plastic resin encapsulating the disc and the collar (b) (ii) to which the pivot pin (d) (ii) projects, and
   g. a resilient seat member having
      i. an annular, ring-like portion disposed within the groove (a) (iii) and between the body (a) and the lining (b), and
      ii. two diametrically opposed collars integrally formed with the ring-like portion (g) (ii), each collar engaging about one of the lining collars (b) (ii), the resilient seat member yieldably urging the lining (b) into engagement with the disc (c) when said disc is in a position in a plane transverse to the flow passage of the lining (b).

9. The invention of claim 8 wherein two parallel annular ribs are formed on the outer surface of the lining (b) to engage sidewalls of the groove (a) (iii) of the valve body (a) such that the resilient seat member (g) is retained between said ribs and within the groove (a) (iii).

10. The invention of claim 9 wherein a plurality of spaced holes are provided in the ribs formed on the outer surface of the lining (b), and spaced tips are formed on the resilient seat member (g) engaging the holes of the ribs to restrict movement of the resilient seat.

11. The invention of claim 8 wherein the lining (b) tapers to a larger thickness from a point adjacent the resilient seat member (g) outwardly to the end flanges (b) (i) thereof.

12. The invention of claim 8 wherein the plastic resin in each instance is fluorocarbon resin.

13. The invention of claim 8 wherein the first packing means (e) includes,
   at least one annular packing member, and
   a compression spring biasing the packing member into sealing engagement with the valve stem (d) (i) and lining (b) within the collar (b) (ii) through which the valve stem (d) (i) passes, and wherein the second packing means (f) includes,
   at least one annular packing member, and
   a compression spring biasing the packing member into sealing engagement with the boss formed of the plastic resin encapsulating the disc (d) and lining (b) within the collar (b) (ii) through which the pivot pin (d) (ii) passes.

14. The invention of claim 13 wherein the annular packing members include a plurality of annular rings of wedge shape cross-section.

15. A butterfly valve including,
   a. a body member having,
      i. a cylindrical bore,
      ii. diametrically opposed openings communicating with said bore, and
      iii. an inwardly-facing annular groove centrally formed in the wall of the bore (a) (i), the axis of the annulus of which is coextensive with the axis of the bore (a) (i),
   b. a fluorocarbon resin lining seated within the cylindrical bore of the body (a) defining a flow passage therethrough, and having
      i. end flanges extending radially over the ends of the body (a), and
      ii. diametrically opposed collars extending from the outer surface of and about apertures formed in the lining (b), engaging within the opposed openings (a) (ii) of the body member (a),
   c. a disc, encapsulated with fluorocarbon resin, pivotally mounted within the lining (b) and body member (a) for movement into and out of a position in a plane transverse to the flow passage of the lining (b),
   d. said disc (c) being pivotally mounted by means of,
      i. a valve stem rigidly secured to the disc and projecting through one of the collars (b) (ii) and openings (a) (ii), and
      ii. a pivot pin secured to the body (a) projecting through the other of the collars (b) (ii) and openings (a) (ii) and engaging a socket formed in the disc (c), said socket including a boss formed of the fluorocarbon resin encapsulating the disc receivably engaging about said pivot pin,
   e. first packing means disposed between and for sealing between the valve stem (d) (i) and the collar (b) (ii) through which said stem projects, the first packing means more specifically including,
      i. at least one annular packing member, and
      ii. a compression spring biasing the packing member (e) (i) into sealing engagement with the valve stem (d) (i) and lining (b) within the collar (b) (ii) through which the valve stem (d) (i) passes,
   f. second packing means disposed between and for sealing between the boss formed of the fluorocarbon resin encapsulating the disc and the collar (b) (ii) through which the pivot pin (d) (ii) projects, said second packing means more specifically including,
      i. at least one annular packing member, and
      ii. a compression spring biasing the packing member into sealing engagement with the boss formed of the fluorocarbon resin encapsulating the disc (d) and lining (b) within the collar (b) (ii) through which the pivot pin (d) (ii) passes, and
   g. a resilient seat member having
      i. an annular, ring-like portion disposed within the groove (a) (iii) and between the body (a) and the lining (b) and
      ii. two diametrically opposed collars integrally formed with the ring-like portion (g) (ii), each collar engaging about one of the lining collars (b) (ii), the resilient seat member yieldably urging the lining (b) into engagement with the disc (c) when said disc is in a position in a plane transverse to the flow passage of the lining (b).

16. The invention of claim 15 wherein two parallel annular ribs are formed on the outer surface of the lining (b) to engage the sidewalls of the groove (a) (iii) of the valve body (a) such that the resilient seat member (g) is retained between said ribs and within the groove (a) (iii).

17. The invention of claim 16 wherein a plurality of spaced holes are provided in the ribs formed on the outer surface of the lining (b), and spaced tips are formed on the resilient seat member (g) engaging the holes of the ribs to restrict movement of the resilient seat.

18. The invention of claim 15 wherein the lining (b) tapers outwardly to a larger thickness from a point adjacent the resilient seat member (g) to the end flanges (b) (i) thereof.

* * * * *